Figure 2:
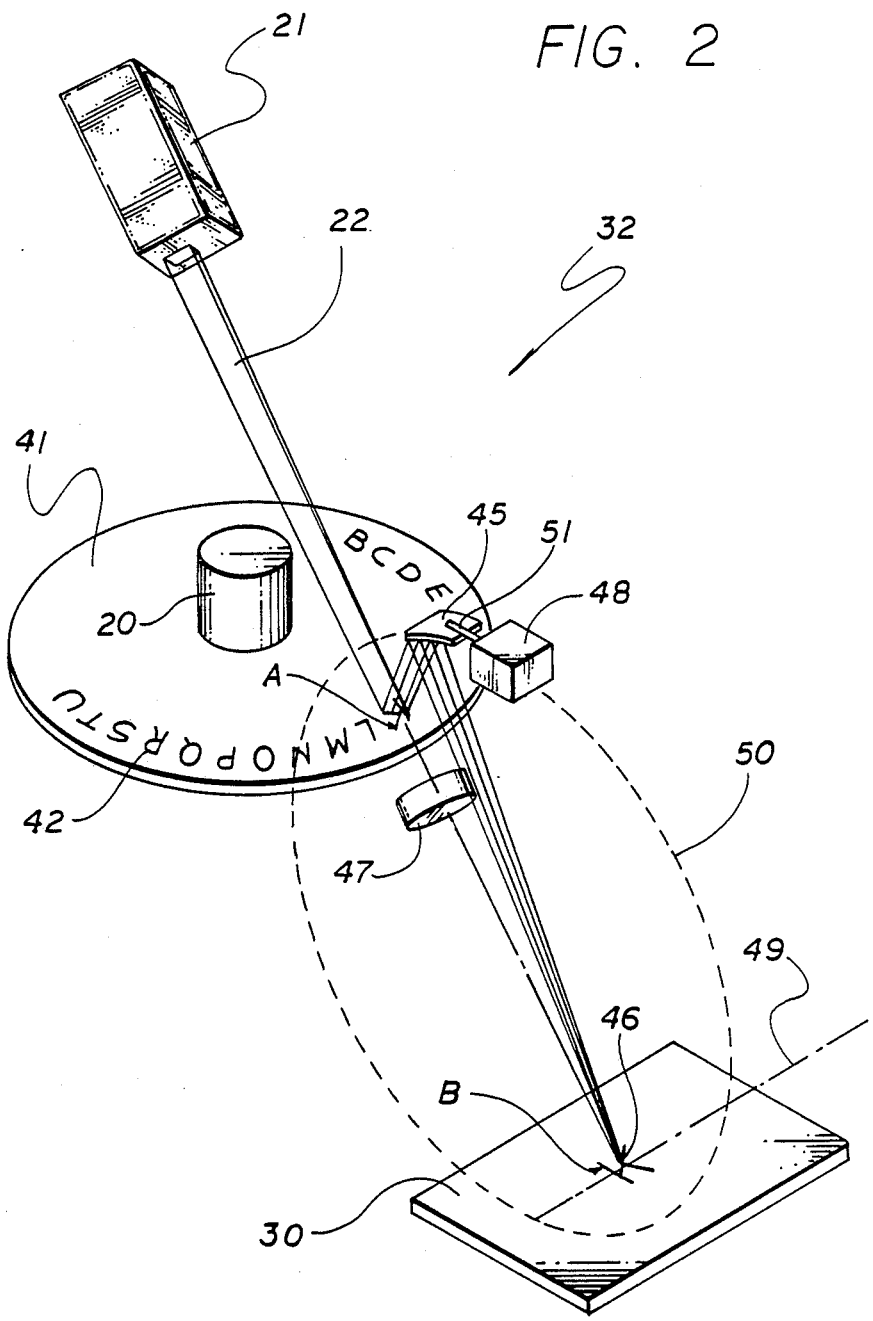

United States Patent [19]

Myer

[11] Patent Number: 4,803,336

[45] Date of Patent: Feb. 7, 1989

[54] HIGH SPEED LASER MARKING SYSTEM

[75] Inventor: Jon H. Myer, Woodland Hills, Calif.

[73] Assignee: Hughes Aircraft Company, Los Angeles, Calif.

[21] Appl. No.: 143,867

[22] Filed: Jan. 14, 1988

[51] Int. Cl.4 ............................................. B23K 26/00
[52] U.S. Cl. ............................ 219/121.68; 219/121.74; 346/76 L
[58] Field of Search ...................... 219/121.68, 121.69, 219/121.74, 121.73; 346/76 L; 354/12, 15; 355/11

[56] References Cited

U.S. PATENT DOCUMENTS

| | | | |
|---|---|---|---|
| 3,617,702 | 11/1971 | Flournoy | 219/121 LS X |
| 3,739,088 | 6/1973 | Landsman | 219/121 LJ X |
| 4,156,124 | 5/1979 | Macken et al. | 219/121 LH |
| 4,430,548 | 2/1984 | Macken | 219/121 LQ X |
| 4,480,169 | 10/1984 | Macken | 219/121 LH |
| 4,568,982 | 2/1986 | Follett | 346/76 L |

Primary Examiner—C. L. Albritton
Attorney, Agent, or Firm—V. D. Duraiswamy; A. W. Karambelas

[57] ABSTRACT

A high speed laser marking system (32) is disclosed which includes a laser (21) for generating a pulsed beam (22) of electromagnetic energy and reflective symbol generating means (41, 42) for forming the image of a symbol on a target (30). The symbol generating means includes an element (42) for reflecting the beam to form the image of the symbol on the target (30). The reflective element (42) includes mirrors for reflecting a plurality of symbols. In a specific embodiment, the invention includes a wheel (41) on which a plurality of mirrored elements (42) are disposed. The wheel (41) is driven under control of a conventional control system to provide for the irradiation of a selected symbol. In a more specific embodiment, the invention includes an ellipsoidal mirror (45) to direct the reflected radiation to the target. A further more specific embodiment of the invention includes reflective holographic elements designed to reflect images of selected symbols to the target.

13 Claims, 2 Drawing Sheets

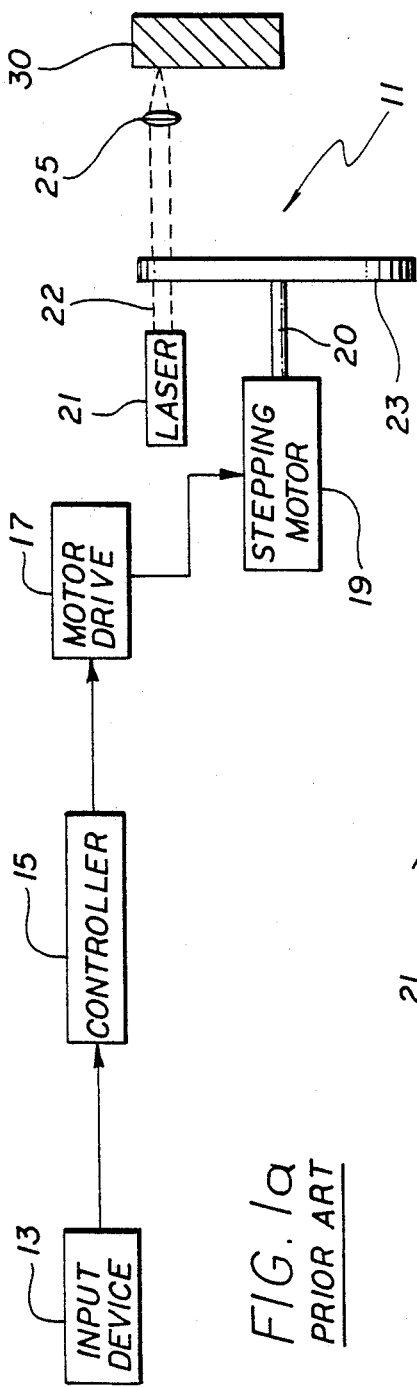
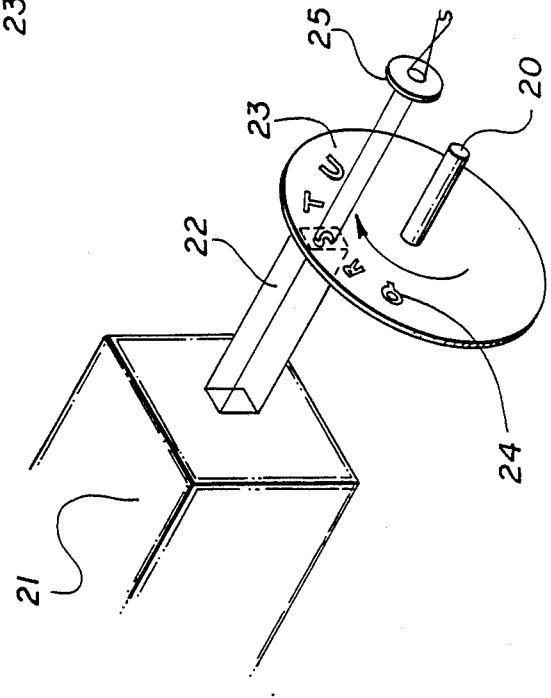
FIG. 1a PRIOR ART
FIG. 1b PRIOR ART

HIGH SPEED LASER MARKING SYSTEM

BACKGROUND OF THE INVENTION

1. Field of the Invention

This invention relates to laser marking systems. More specifically, the present invention relates to methods and apparatus for the high speed generation of character or symbol patterns used to mark objects by means of focused laser radiation.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof.

1. Description of the Related Art

Laser marking systems are known in the art. At or about the time of the filing of the present application, the Markem Corporation of Keene, N.H. was engaged in the manufacture of a system which reflected the state of the art in laser marking tools. In general, laser marking tools are used to etch an identifying symbol or set of symbols on a surface or object. In certain applications, high speed is required to make a number of marks on a number of articles of manufacture.

At least two marking techniques are known in the art. The first involves the writing of each character or symbol in a script style. The other involves the stenciling of each symbol or character by a pulsed laser beam. The stenciling technique involves the use of a mask wheel which has a peripheral template with a plurality of transmissive character or symbol pattern apertures. The mask wheel is spun into position and the laser is activated to generate the desired character at the target.

The writing technique is most often used, as it requires much less power than the stenciling technique. The stenciling technique, however, is faster. Unfortunately, there are problems with the stenciling technique that have heretofore limited its utility for the high speed applications mentioned above. For example, the high beam power required for the high speed stenciling of metallic, ceramic or glassy surfaces tends to damage the transmissive stencil. This in turn necessitates the use of large aperture patterns for stencils to reduce the radiant energy density on the aperture mask. When the resultant large diameter mask wheel is spun at high speeds coincident with high laser pulse repetition rates, centrifugal forces are generated which can cause the wheel to rupture.

Further, the marking of metals, ceramics and glassy surfaces requires laser radiation of short wavelengths to maximize energy coupling into the target thereby minimizing the total required energy. This necessitates the substitution of high temperature tolerant refractive elements in the stencil when alternate high power short wavelength laser sources are used.

There is therefore a need in the art for a high speed laser marking apparatus and technique which does not require costly maintenance and substitution of the symbol mask.

SUMMARY OF THE INVENTION

The need in the art is addressed by the high speed laser marking system of the present invention which includes a laser for generating a beam of electromagnetic energy and symbol generating means for forming the image of a symbol on a target. The symbol generating means includes an element for reflecting one of a number of images of the symbol on the target and means for selecting any one of the symbols to be reflected at a time.

In a specific embodiment, the invention includes a wheel on which a plurality of mirrored elements are disposed. The wheel is driven under control of a conventional control system to provide for the irradiation of a selected symbol. In a more specific embodiment, the invention includes an ellipsoidal mirror to direct the reflected radiation to the target. A further more specific embodiment of the invention includes mirrored reflective elements designed to reflect mirrored or holographic images of selected symbols to the target.

DESCRIPTION OF THE INVENTION

A typical stencil type laser marking system 11 constructed, in accordance with the teachings of the related art, is shown in FIGS. 1(a) and 1(b). The system 11 includes an input device 13 which provides for symbol selection. The input device 13 may be a switch from a keyboard, a memory device, or other input device as is known in the art. The input device 13 provides the selected symbol to a controller 15. The controller 15 is coupled to a motor drive 17 for a stepping motor 19. The stepping motor 19 has a shaft 20 extending therefrom which is connected to a wheel 23. The controller 15 may be implemented by a lookup table stored in a read-only-memory (not shown). As shown in FIG. 1(b), the wheel 23 has a plurality of transmissive character apertures 24 mounted about the periphery thereof.

In operation, the controller 15 sends appropriate signals to the motor drive 17 to activate the stepping motor 19 to position the wheel 23 so that light in a beam 22 from a laser 21 may illuminate the selected character 24. Light in the beam 22 is then focused by a lens 25 onto a target 30. A high energy laser light pulse is timed to occur at the same instant as the selected character appears in the laser beam.

As discussed above, there are numerous disadvantages associated with the conventional aperture system of FIGS. 1(a) and 1(b). For example, the high beam power required for high speed stenciling of metallic, ceramic or glassy surfaces tends to damage the transmissive stencil apertures 24. This in turn necessitates the use of large aperture patterns for stencils to reduce the radiant energy density on the aperture mask. Unfortunately, when the resultant large diameter mask wheel is spun at high speeds to coincide with a high pulse repetition rate laser, the perforated wheel can rupture due to centrifugal forces. Further, in the case of a solid transparent stencil wheel the transparency characteristics of the wheel must be matched to the laser wavelength. The wheel must often be changed to accommodate lasers operating at other wavelengths. In addition, aperture systems are limited to stencil type alphabets and symbols.

The advantageous operation afforded by the present invention addresses these shortcomings of conventional high speed laser marking systems. As shown in the illustrative embodiment of FIG. 2, the high speed laser marking system 32 of the present invention employs a reflective character template wheel to form characters and symbols on the target 30. In the design of the present invention, there are no lossy or sensitive refractive focusing elements whose transparency characteristics must be matched to the laser wavelength.

The template wheel 41 may be of conventional design and construction with the exception that the present invention allows for the wheel to be of a larger diameter than that of conventional large aperture wheels. The larger diameter of the wheel 41 of the present invention permits low power density at the template pattern and high speed operation with minimal susceptibility to centrifugal disintegration. The structural integrity of the wheel 41 of the present invention is further enhanced when compared to the prior art by the fact that the wheel 41 of the present invention is not weakened by the removal of material for the apertures for the stencil type characters.

As mentioned above, the present invention employs a plurality of reflective characters 42 in place of the stencil type characters of the related prior art. In the illustrative embodiment, the characters 42 are implemented by mirrors, in the shape of the desired character set, integral with the wheel 41. The wheel 41 provides a background for the reflective characters which may be metallic with an antireflection coating. The characters 42 may be raised to provide improved edge definition and defocused background. In an alternative embodiment, the wheel is constructed of glass or quartz and the characters are stored as holographic optical elements in a plurality of thin film coatings, on the wheel. Thin film deposition of holographic optical elements is well known in the art. The thin films would provide the dual function of character formation and character focusing on the target. The thin film technique would also offer reduced fabrication costs.

Whether the reflective characters 42 are implemented with contoured mirrors or optical thin films, the character should reflect as much of the energy in the beam 22 from the laser 21 as possible (e.g. 99%) to a target or workpiece 30 via an ellipsoidal mirror 45. As is known in the art, ellipsoidal mirrors receive light from one focus 'A' of an ellipse 50 and focus it at the second focus 'B' of the ellipse 50. In this case, the second focus 'B' of the ellipse is the center of the target 30. The ellipsoidal deflection mirror 45 is driven at high angular rates by the galvanometric drive 48 through a shaft 51 to position the selected character (for example "K") along the writing line 49 of the target 30.

As shown in FIG. 2, radiation from the laser 21 spilling past the selected character is collected by a conventional optical dump 47 mounted in the optical path thereof.

In operation, the laser 21 emits high energy radiation pulses which are projected onto the wheel 41 and reflected onto the writing line 49 on the target 30. The wheel 41 is driven by the conventional system of FIG. 1(a) including the input device 13, the controller 15, the motor drive 17 and the stepping motor 19 via the shaft 20. The selection of a particular character 42, the phase relationship between the laser pulses and the angular position of the wheel 41 are controlled by the controller 15 such that rotation of the wheel 41 and timing of the laser 21 are stroboscopically synchronized.

Thus a novel high speed reflective laser marking system has been disclosed with reference to a particular embodiment for a particular application. The system of the present invention is adaptable to support a variety of font styles and is not limited to stencil type characters. Those skilled in the art having access to the teachings provided herein will recognize additional modifications, applications, and embodiments within the scope thereof. For example, the invention is not limited to the shape of nor the use of the wheel 41. A cylinder or other suitable support surface may be used without departing from the scope of the invention. Further, multiple tracks or images may be stored on the wheel without departing from the invention. In addition, the wheel 41 may be curved into a spherical shell to focus the reflected beam. The ellipsoidal mirror may be eliminated for some applications. As mentioned above, the invention is not limited to laser marking. The invention may be used in any image transfer application without departing from the scope thereof.

It is intended by the appended claims to cover any and all such modifications, applications and embodiments within the scope of the invention.

Accordingly, what is claimed is:

1. A high speed system for marking a symbol or group of symbols on a target, said system comprising:
   laser means for generating a beam of electromagnetic energy and
   symbol generating means for forming the image of a symbol on a target, said symbol generating means including:
      reflective means for reflecting said beam of energy to form said image on said target, said reflective means including means for generating a plurality of symbols, and
      means for selecting one of said plurality of symbols to be generated by said reflective means.

2. The invention of claim 1 wherein said means for selecting one of said plurality of symbols to be generated by said reflective means includes wheel means for supporting said means for generating a plurality of symbols.

3. The invention of claim 2 wherein said means for selecting one of said plurality of symbols to be generated by said reflective means includes wheel drive means for actuating said wheel means to select one of said symbols to be generated by said reflective means.

4. The invention of claim 3 wherein said means for selecting one of said plurality of symbols to be generated by said reflective means includes control means for controlling said wheel drive means to actuate said wheel drive means to select one of said symbols to be generated by said reflective means.

5. The invention of claim 1 including focusing mirror means for directing said reflected beam of energy to said target.

6. The invention of claim 5 wherein said focusing mirror means includes mirror drive means.

7. The invention of claim 1 wherein said means for generating a plurality of symbols includes thin film optical elements on a template wheel.

8. The invention of claim 7 wherein said template wheel is at least partially transparent.

9. The invention of claim 8 including optical dump means for receiving electromagnetic energy not reflected by said reflective means.

10. The invention of claim 1 wherein said reflective means includes holographic element means for reflecting an image onto said target.

11. A high speed system for marking a symbol or group of symbols on a target, said system comprising:
   laser means for generating a beam of electromagnetic energy;

symbol generating means for forming the image of a symbol on a target, said symbol generating means including:
- reflective means for reflecting said beam of energy to form said image on said target, said reflective means including mirror means for generating a plurality of symbols, and
- select means for selecting one of said mirror means, said select means including wheel means for supporting said mirror means, wheel drive means for actuating said wheel means, and control means for selectively activating said wheel drive means to select said symbol for reflecting a selected symbol onto said target; and
- focusing mirror means for directing and concentrating said reflected beam of energy onto said target.

12. A high speed system for marking a symbol or group of symbols on a target, said system comprising:
- laser means for generating a beam of electromagnetic energy;
- symbol generating means for forming the image of a symbol on a target, said symbol generating means including:
  - reflective means for reflecting said beam of energy to form said image on said target, said reflective means including mirror means for generating a plurality of symbols, and
  - select means for selecting one of said mirror means, said select means including wheel means for supporting said mirror means, wheel drive means for actuating said wheel means, and control means for selectively activating said laser means for reflecting a selected symbol onto said target; and
- focusing mirror means for directing and concentrating said reflected beam of energy onto said target.

13. An improved method for marking a target with a pulsed laser beam including the steps of:
(a) generating a beam of pulsed electromagnetic energy and
(b) forming the image of a symbol on a target, said step of forming the image of a symbol on a target including the steps of:
  (b1) reflecting said pulsed beam of radiant energy to form said image shape on said target, said step of reflecting a beam of energy to form an image on said target includes the step of generating a plurality of symbols, and
  (b2) selecting one of said plurality of reflective symbols to be generated by said reflective means coincident with said pulsed beam of radiant energy.

* * * * *